United States Patent [19]
Englert

[11] Patent Number: 5,269,914
[45] Date of Patent: Dec. 14, 1993

[54] UNDERGRAVEL FILTRATION SYSTEM

[76] Inventor: Francis P. Englert, 2 Valencia La., Clifton Park, N.Y. 12065

[21] Appl. No.: 14,683

[22] Filed: Feb. 8, 1993

[51] Int. Cl.⁵ .......................................... A01K 63/04
[52] U.S. Cl. ................................. 210/151; 210/169;
   210/416.2; 119/261; 261/DIG. 72
[58] Field of Search ............ 210/150, 151, 169, 416.2,
   210/197, 220, 221.1; 261/119.1, 126, DIG. 72;
   119/5

[56] References Cited

U.S. PATENT DOCUMENTS

| | | | |
|---|---|---|---|
| 4,072,736 | 2/1978 | Fattinger | 261/DIG. 72 |
| 4,076,619 | 2/1978 | Howery | 210/169 |
| 4,385,989 | 5/1983 | Margolis | 210/169 |
| 4,749,493 | 6/1988 | Hicks | 210/169 |
| 5,011,600 | 4/1991 | Mowka et al. | 210/169 |
| 5,116,489 | 5/1992 | Englert | 210/169 |

Primary Examiner—Peter A. Hruskoci
Assistant Examiner—Robert James Popovics
Attorney, Agent, or Firm—Wall and Roehrig

[57] ABSTRACT

An improved filtration system for an aquarium having a water-filled habitation area with the water being aerated and circulated. The filtration system comprises a perforated platform adapted to be placed on a bottom surface of the aquarium and covered by a layer of porous material. The platform and the bottom surface define a subspace therebetween, and perforations admit water that circulates between the habitation area and the subspace. A hollow column, having an interior in fluid communication with the subspace, and carrying water circulating therethrough, extends through the platform and at its terminus discharges the circulating water back into the aquarium. A plurality of media elements, located in the column, each has a large surface area portion that is exposed to the circulating water.

10 Claims, 3 Drawing Sheets

UNDERGRAVEL FILTRATION SYSTEM

BACKGROUND OF THE INVENTION

This invention relates to an undergravel filtration system for use in aquarium systems. More particularly this invention relates to an improved undergravel filtration system which maintains water in good condition with respect to aeration, cleanliness and removal of toxic waste products.

The maintenance of fish in aquariums for observation is a popular activity. Fish have among the lowest maintenance requirements of any common household pets. They add beauty and tranquility to hotel lobbies, professional offices, restaurants and other environs both public and private.

Fish and other aquarium dwellers are not, however, entirely maintenance free. In order to view the denizens of an aquarium clear water and clean aquarium walls are required. In order to maintain the aquatic animals in good health, well aerated water, free of filth and toxic waste products is necessary.

There are a number of different means of accomplishing this goal. The various methods may be used singly, or in combination. One such means is an undergravel filtration system. Another is a separate filter, in close proximity to the aquarium, through which the aquarium water is filtered.

The undergravel filtration system takes advantage of the layer of gravel, sand, or the like, which is frequently kept at the bottom of an aquarium. This layer of porous material is sometimes colored or sculpted to present a pleasant appearance, discretely catches solid wastes, if particulate, serves as an anchor for some aquatic plants, and mimics a natural environment for bottom feeders.

A typical undergravel filtration system comprises a perforated platform which is placed against the bottom of the aquarium and covered with a gravel layer. A circulation system is attached which allows air to be forced down into the region under the platform and aerate the water it encounters there, the water freely circulating between this space and the habitation area of the aquarium.

The aerated water, after rising through the column and returning to the habitation area of the aquarium, serves as an oxygen source for the aquatic aerobic colonies located in the gravel. Excess air from the water filled habitation area of the aquarium escapes into the surrounding environment.

At the same time, the gravel serves to filter some particulate impurities from the water passing down through it and thus to cleanse and clarify the water. The water is then recirculated to the water filled habitation area of the aquarium. Ideally this is done by returning the water to the aquarium from above the surface of the aquarium, so that additional air is brought into the habitation area.

In my earlier patent, U.S. Pat. No. 5,116,489 I disclosed a reef biological filtration device which drew unfiltered water from the water filled habitation area of an aquarium and returned aerated and filtered water thereto. The water passed upward through a column of stacked large surface area media or bio-balls which served for both filtration and as surface elements for the growth of colonies of aerobic bacteria.

The cultivation of colonies of aerobic bacteria assists in the maintenance of a desirable environment in an aquarium system. Among the waste products of fish and other sizeable aquatic residents is ammonia and other nitrogenous materials. Aquatic aerobic bacteria utilize nitrogenous waste in their nutritional cycle, converting this waste to compounds with a lower degree of toxicity. It is thus desirable to create and maintain colonies of aquatic aerobic bacteria in the aquarium system environment. It is also desirable to do so at a minimal cost, and under conditions which allow for as little maintenance effort as possible.

For healthy growth and maintenance of colonies of aquatic aerobic bacteria a number of conditions must be met. First, sufficient oxygen must be present in the water to meet the needs of the aerobic bacteria, as these organisms not only use oxygen, but also depend upon it. Second, stagnation must be avoided by maintaining water flow, usually by circulation. Aquatic aerobic bacteria depend on water flow to transport the required oxygen to their colonies, and stagnation means oxygen starvation. Third, the water must be channeled so that there are no regions which are not exposed to aerated water. The creation of such non-aerated regions or dead spaces has a deleterious effect on the system because anaerobic bacteria are encouraged to grow in dead spaces. Anaerobic bacteria produce wastes that are toxic to aquatic animals and hence are hazardous to them. Fourth, a large surface area media is desirable as colonies of aerobic bacteria tend to attach themselves to exposed surfaces and, under favorable conditions, the larger the surface area the more colonies of aerobic bacteria that can be maintained.

Unfortunately, the last two requirements are not inherently mutually compatible. Thus, for example, gravel can be made to have a larger and larger surface area by breaking it up into successively smaller pieces. When gravel or sand becomes extremely fine, however, it becomes extremely difficult to maintain water flow in a uniform and efficient mode, to prevent channeling, and to keep the media functionally clean.

Keeping the media clean is necessary for both the appearance of the system and the health of the aquatic life. However, cleaning presents a problem. When filters are back-flushed or otherwise cleaned, most of the colonies of aquatic aerobic bacteria are destroyed in the process. Although sufficient aerobic bacteria generally remain that the fully active colonies will eventually be reestablished, for some period of time the system must function without the benefit of thriving colonies of aquatic aerobic bacteria. Because of this hiatus, the aquatic animals are exposed to unhealthy conditions, and the environment of the aquarium system disintegrates more rapidly so that more frequent maintenance is necessary.

SUMMARY OF THE INVENTION

It is therefore a primary object of the present invention to provide an improved undergravel filtration system for aquariums.

It is a further object of the present invention to provide an undergravel filtration system for aquariums that takes advantage of both media inside the aquarium and media external to the aquarium as sites for aquatic aerobic bacterial colony growth.

It is yet another object of the instant invention to provide an undergravel filtration system for aquariums that uses a reef chamber filter providing a large surface external to the aquarium in addition to porous material in the aquarium as sites for aquatic aerobic bacterial colony growth.

These and other objects of the present invention are attained by a filtration system for an aquarium having a water-filled habitation area, comprising a perforated platform adapted to be placed on a bottom surface of the aquarium and to be covered by a layer of porous material, with the platform and the bottom surface defining a subspace therebetween, and perforations admitting water that circulates between the habitation area and the subspace, a hollow column extending through the platform and having an interior in fluid communication with the subspace, the column carrying water circulating therethrough and terminating in a discharge means for returning the circulating water into the aquarium, means for circulating water through the aquarium, the platform and the column, a plurality of media elements, located in the column, each having a large surface area portion that is exposed to the circulating water, and air transport means, connected to a high pressure source of air, for aerating the circulating water.

BRIEF DESCRIPTION OF THE DRAWINGS

For a better understanding of these and other objects of the present invention, reference is made to the detailed description of the invention which is to be read in conjunction with the following drawings, wherein.

DETAILED DESCRIPTION OF THE INVENTION

Figure 1:
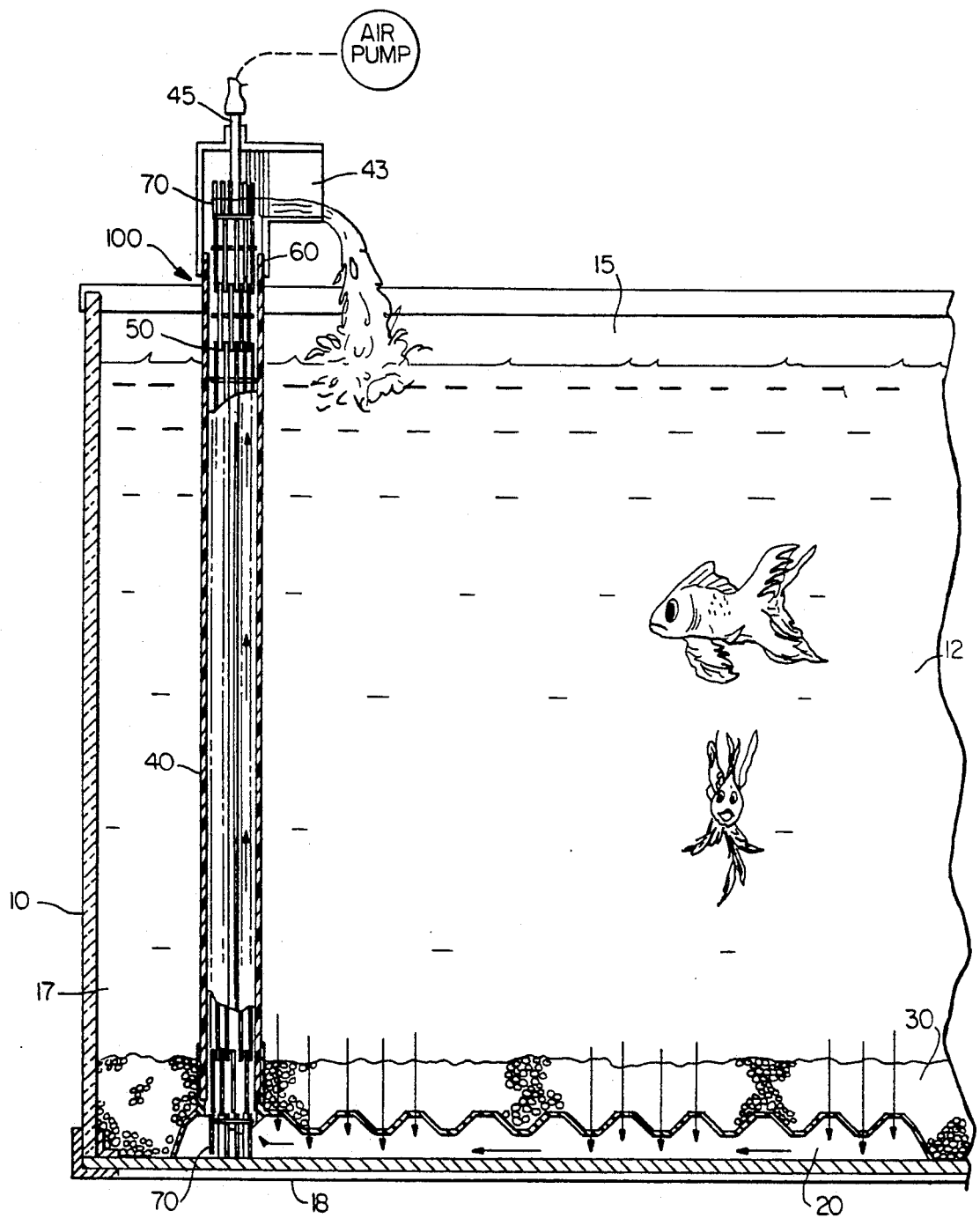
FIG. 1 is a block diagram of a typical aquarium containing the undergravel filtration system of the present invention.

Referring now to FIG. 1, there is shown a preferred embodiment of the undergravel filtration system 100 of the instant invention in operation in an aquarium 10 having a habitation area 12 for fish, other aquatic animals or the like. A platform 20 is placed inside and flush against the bottom 18 of the aquarium 10 and covered with a layer of sand, gravel or the like 30. Extending from the platform 20 upward and above the surface 15 of water 17 in the aquarium 10 is a hollow column 40 filled with reef biological bio-balls 50 which are described in detail below. At the top end of the hollow column 40, above the surface of the water 15 is a return chute 43 for returning circulated water to the aquarium and an inlet 45 for forcing air into the system as will be described.

Figure 2:
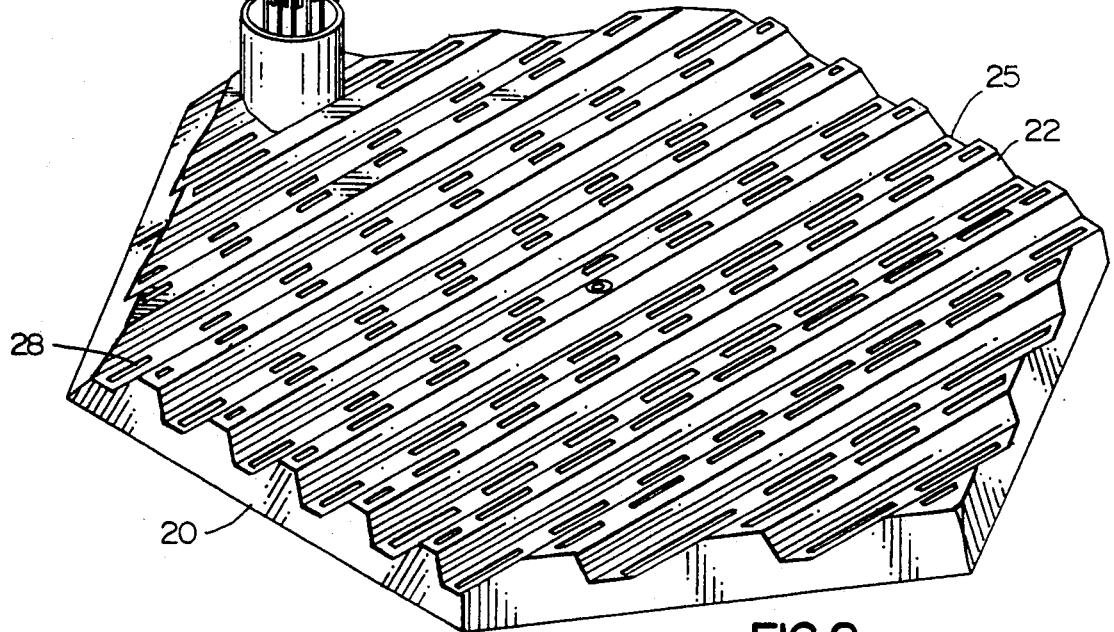
FIG. 2 is a perspective view of the undergravel filtration system of the present invention showing the undergravel platform and hollow column containing reef filtration bio-balls.

Referring now to FIGS. 1 and 2 the path of circulation of air and water through the system can be seen. Air is pumped into the system by an air pump (not shown) through a nipple 47 or like connection to an inlet tube 45 extending upward beyond the end of the hollow column 40. The inlet tube 45 is connected in turn to the central tube 53 of the topmost inner bio-ball 60 to be described below. The air is forced downward through successive central tubes 53 of stacked inner bio-balls 60 and beneath the platform 20, and to increase the water pressure sufficiently to force water upwardly through the hollow column. The shaft formed by the central tubes of contiguous stacked central bio-balls is isolated from the high surface area region 55 of the bio-balls 60 so that the air passing downward through the central tubes 53 is isolated from the water that passes upward over the high surface area portion 55 and 78 of the bio-balls 50.

After progressing down through the central tubes 53 of the stacked bio-balls 60 the air is passed beneath the platform 20 where it serves to aerate water beneath the platform 20.

At the same time as air moves through the system, water circulates by passing from the habitation area 12 of the aquarium 10 downward through the gravel 30 and then through perforations 28 in the platform 20. In the preferred embodiment the platform is grooved with perforations 28 in both grooves 25 and ridges 22. This helps stabilize the platform 20 on the floor 18 of the aquarium 10.

From underneath the platform 10, the water is aerated as described above, and then forced up the hollow column 40 where it passes over the high surface area portions 55 and 78 of the bio-balls 50. Once at the top of the column the water is discharged through return chute 43 from where it splashes back into the habitation area 12 of the aquarium, being further aerated in the process.

Figure 3:
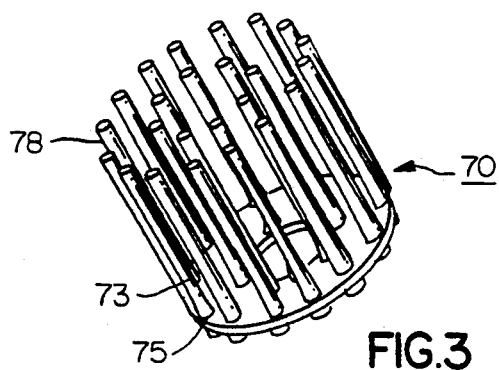
FIG. 3 is a perspective view of an end bio-ball.
Figure 4:
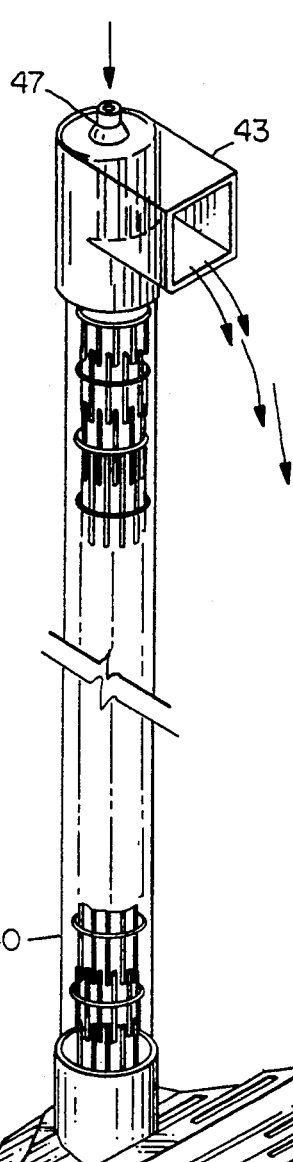
FIG. 4 is a perspective view of a central bio-ball.
Figure 4:
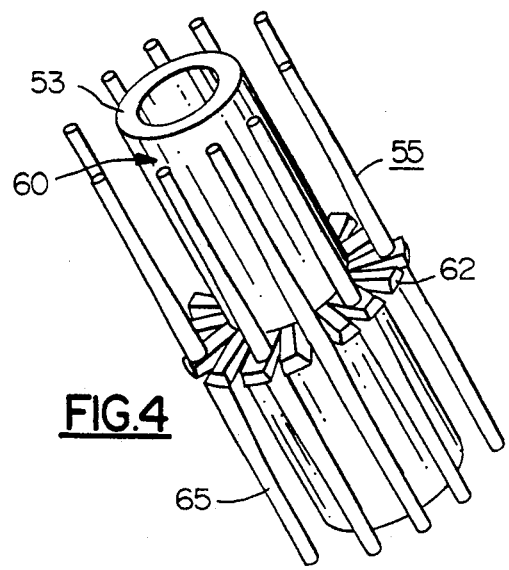
Figure 5:
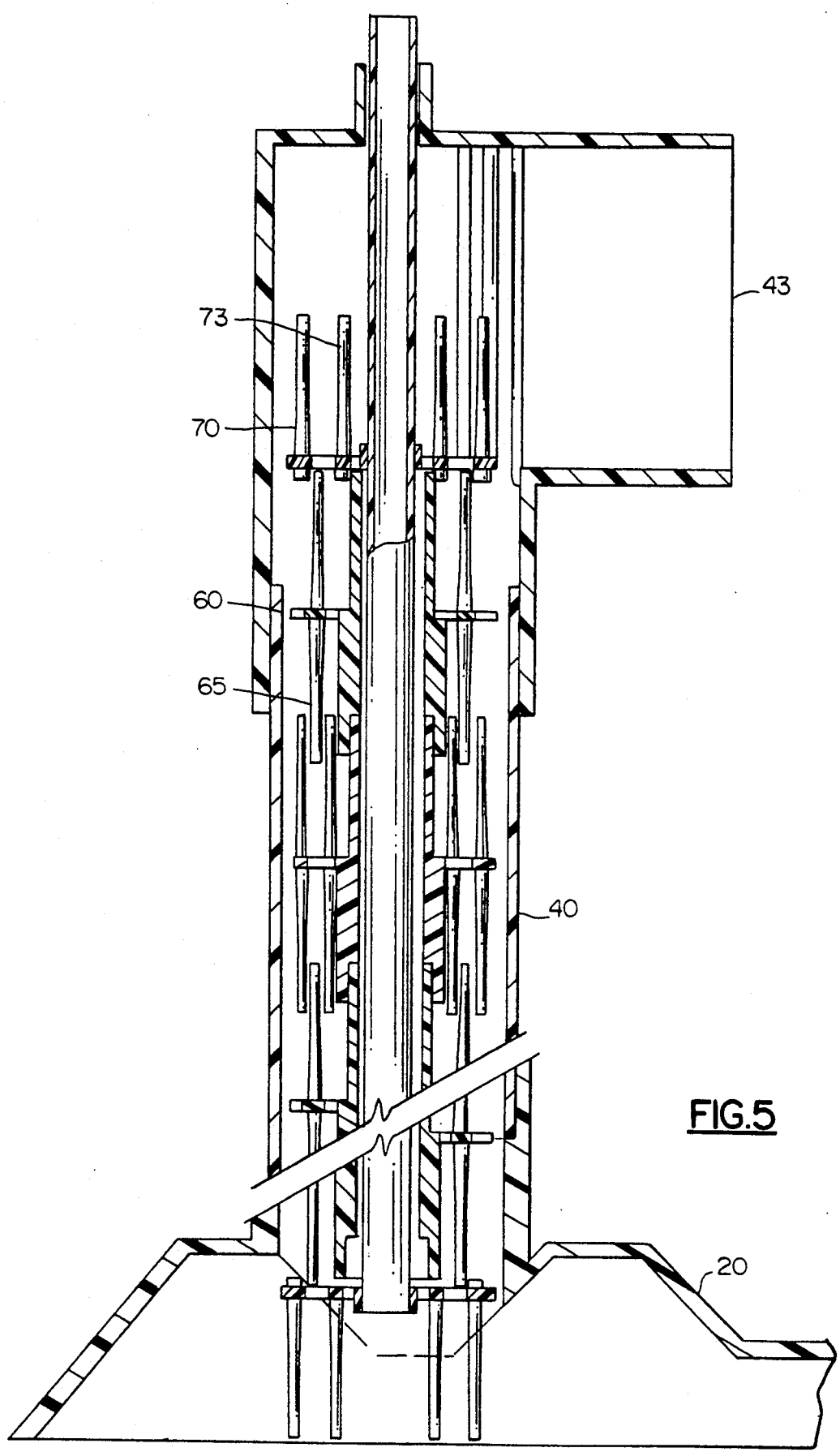
FIG. 5 is a cross-sectional view of the hollow column containing reef filtration bio-balls as mounted on the undergravel platform.

Turning now to FIGS. 3-5, the construction and placement of bio-balls 50 in stackable form is clearly shown. In the preferred embodiment two types of bio-balls 50 exist, inner bio-balls 60 and outer bio-balls 70. It is preferable to have at least six bio-balls in the stack so as to allow for cleaning as will be described below.

The outer bio-balls 70 are formed from an annular disk 75 with a plurality of spaced apart prongs 73 projecting perpendicularly from one surface of the disk 75. These prongs 73 serve as high surface area media 78 for the growth of colonies of aquatic aerobic bacteria. In the preferred embodiment there are approximately twenty-four (24) prongs 73.

The inner bio-balls 60 are formed about a hollow cylindrical tube 53. Extending radially from the tube 53, at about halfway down its length, are a plurality of tabs 62. The tabs 62 are used to support a plurality of spaced-apart prongs 65 which are positioned parallel to the axis of the cylindrical tube 53 and are the same length as the cylindrical tube 53. These prongs 65 serve as high surface area media 55 for the growth of colonies of aquatic aerobic bacteria. In the preferred embodiment there are approximately ten (10) prongs 65.

The bio-balls are stacked inside the hollow column 40 with an outer bio-ball 70 at the bottom of the stack, its prongs 73 extending downward through the platform 20 to rest on the bottom 18 of the aquarium 10, followed by a stack of inner bio-balls 60, followed by an outer bio-ball 70 with its prongs 73 facing upward.

Prongs 65 from adjacent inner bio-balls 60 nest by fitting into each other's interstices. The side of the outer bio-ball disk without prongs rests against the tips of the prongs 65 of the adjacent inner bio-ball.

Thus, there are two sets of sites for the formation of colonies of aerobic bacteria, namely the gravel 30 and the high surface media portions 55 and 78 of the bio-balls. Furthermore, because the water rises past the bio-balls, contamination of the bio-balls will occur more rapidly for those bio-balls near the bottom of the tank. When the bottom bio-balls become unacceptably contaminated the bottom outer bio-ball and a few inner bio-balls closest to the bottom can be removed for cleaning, and a fresh outer bio-ball inserted at the bottom. At the same time, fresh inner bio-balls can be inserted between the topmost inner bio-ball and the top outer bio-ball. Thus, the bio-ball portion of the system is cleaned without the destruction of all the aquatic aerobic bacterial colonies. Those colonies on the remaining bio-balls will stay intact and the newly inserted bio-balls will be quickly reseeded with aquatic aerobic bacteria.

As would be obvious to one skilled in the art it is also possible to use stacked bio-balls without a central hollow core for water circulation while providing for air circulation via a tube for delivering pumped air beneath the platform, where the tube is attached externally to the column of bio-beads.

While this invention has been explained with reference to the structure disclosed herein, it is not confined to the details set forth and this application is intended to cover any modifications and changes as may come within the scope of the following claims:

What I claim is:

1. An improved undergravel filtration system for an aquarium having a water filled habitation area, said undergravel filtration system comprising:
    a platform designed to be placed on a bottom of an aquarium and covered with a layer of gravel, said platform containing perforations therein through which water may pass downward through the gravel and through said perforations;
    a hollow column extending perpendicularly upward from said platform and terminating in a top;
    a plurality of stackable large surface area media elements, stacked in said hollow column through which water may pass in an upward direction over a large surface area portion of said large surface area media;
    wherein said stackable large surface area media elements each comprises a first portion through which air may pass downward and a second portion, generally isolated from said first portion, through which water may pass upward;
    water discharge means adjacent a top of said hollow column, for discharging water passing upward through said large surface area media elements into the aquarium;
    air inlet means adjacent the top of said hollow column and in fluid communication with said first portion for receiving input air under pressure, the air to be forced through a tube in conjunction with said hollow column, in downward direction and in isolation from said large surface area media, the air to travel beneath said platform, whereby the air serves to aerate water beneath said platform; and
    pump means for forcing air downward through said column at a force sufficient to force water upward through said large surface area media.

2. The undergravel filtration system of claim 1 wherein said hollow column is positioned adjacent an end of said platform.

3. The undergravel filtration system of claim 1 wherein said platform is generally hexagonal in shape.

4. The undergravel filtration system of claim 1 wherein said platform is grooved.

5. The undergravel filtration system of claim 1 where said first portion is central to said second portion.

6. The undergravel filtration system of claim 5 wherein said central portion of each said stackable large surface area media element each comprises a hollow tube.

7. The undergravel filtration system of claim 6 wherein said peripheral portion of each said stackable large surface area media element each comprises at least 6 prongs, spaced about said central portion, in parallel alignment to said central portion, and attached to said central portion by means of tabs, extending from said central portion.

8. The undergravel filtration system of claim 1 wherein said water discharge means extends above a top of an aquarium.

9. A filtration system for an aquarium having a water-filled habitation area, comprising:
    a perforated platform adapted to be placed on a bottom surface of the aquarium and to be covered by a layer of porous material, said platform and the bottom surface defining a subspace therebetween, said perforations admitting water that circulates between said habitation area and said subspace;
    a hollow column extending through said platform and having an interior in fluid communication with said subspace, said column carrying water circulating therethrough and terminating in a discharge means for returning the circulating water into the aquarium;
    means for circulating water through the aquarium, said platform and said column
    a plurality of media elements, located in said column, each of said media elements having a large surface area portion that is exposed to the circulating water;
    wherein said media elements each comprises a first portion through which air may pass downward and a second portion, generally isolated from said first portion, through which water may pass upward; and
    air transport means in fluid communication with said first portion, connected to a high pressure source of air, for aerating the circulating water.

10. The filtration system of claim 9 wherein said plurality of media elements comprise at least six media elements.

* * * * *